Figure 1:
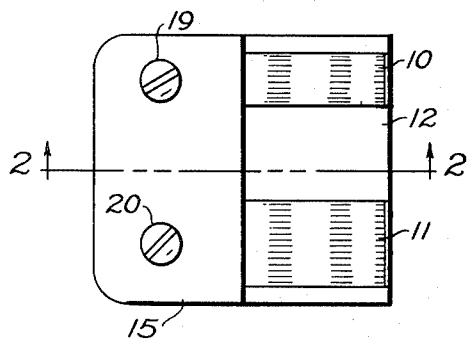

July 3, 1956

J. W. MILLER ET AL 2,753,535

SEISMIC CABLE CONNECTOR

Filed Nov. 7, 1952

2 Sheets-Sheet 1

JOHN W. MILLER
GEORGE B. LOPER
INVENTOR.

BY D. Carl Richards
ATTORNEY

July 3, 1956   J. W. MILLER ET AL   2,753,535
SEISMIC CABLE CONNECTOR
Filed Nov. 7, 1952   2 Sheets-Sheet 2
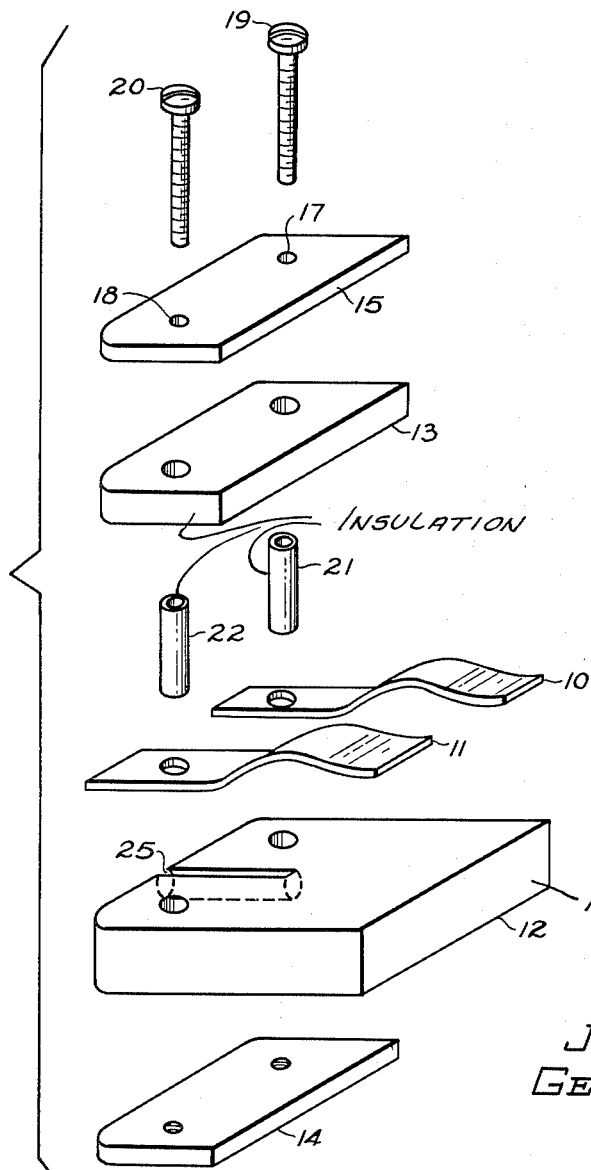
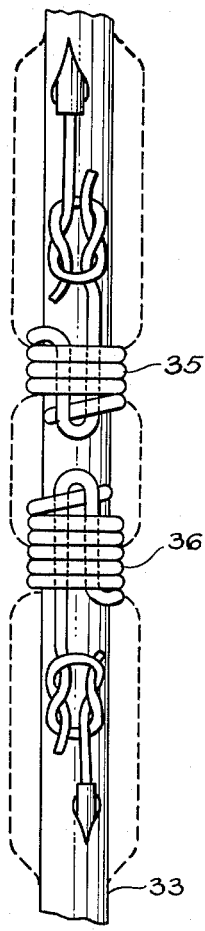
JOHN W. MILLER
GEORGE B. LOPER
INVENTOR.
BY D. Carl Richards
ATTORNEY United States Patent Office 2,753,535
Patented July 3, 1956

2,753,535

SEISMIC CABLE CONNECTOR

John W. Miller and George B. Loper, Dallas, Tex., assignors, by mesne assignments, to Socony Mobil Oil Company, Inc., a corporation of New York Application November 7, 1952, Serial No. 319,277

6 Claims. (Cl. 339—61)

This invention relates to completion of seismic cable circuits and more particularly to connecting seismic detectors to multi-conductor cables at selected intervals along the length thereof.

Field operations in connection with seismic exploration are attended by repeatedly locating a great many seismic detectors at selected points on the earth's surface, connecting each of them by way of cable circuits to recording apparatus for production of seismograms. Thereafter, the seismic detectors are collected for relocation at new selected stations. Among the practical and troublesome problems associated with repeatedly establishing an electrically complete seismic spread is establishing and maintaining noise-free connections between the seismometer and the selected cable circuits.

It is an object of the present invention to provide a cable connecting system which is positive in its contacting action and which is so rugged as to withstand the abuse inherently attending such operations. It is a further object of the present invention to provide a seismic cable connecting system which may withstand severe punishment such as encountered when sustaining occasionally the weight of vehicles.

In accordance with the present invention, there is provided a connector system for completing a circuit from a selected pair of seismic cable conductors to a local seismometer circuit which includes conductive members at least in part cylindrically encompassing selected spaced apart lengths of a multi-conductor seismic cable. Electrical connections are provided between the conductive members and a selected pair of cable conductors. A pair of rigid contact members cantilever supported in a spaced apart relation corresponding with the relation between the conductive members on the cable cooperate with a resilient member also cantilever supported and extending at its free end to a contact facing position with respect to the contact members with a spacing therebetween normally less than the lateral dimensions of the cable at the location of the conductive members for maintaining a contact pressure between the contact members and the conductive members.

In a more specific aspect of the invention, a plug is provided for a local seismometer circuit which comprises a clamp including a pair of rigid metallic plates with a pair of resilient insulating sheets, one of which has substantial thickness, positioned between the plates. The resilient sheet of substantial thickness in part forms a cantilever extension outside the perimeter of the plates. A pair of rigid contact members connected at the terminus of the local seismometer circuit in part are positioned between the rubber sheets and in part extend as cantilevers outside the perimeter of the plates in a spaced apart relation along a line normal to the length of the extension and are provided with concave contact surfaces at the extremities thereof facing the extension. Means insulated from the contact members draw the plates together rigidly to clamp the sheets and contact members whereby the resilient cantilever extension develops forces toward or away from the contact surfaces upon relative displacement between the resilient extension and the contact members.

Figure 5:
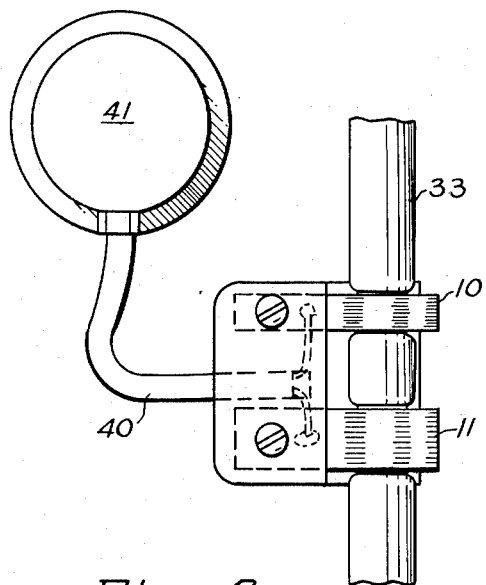
Figure 2:
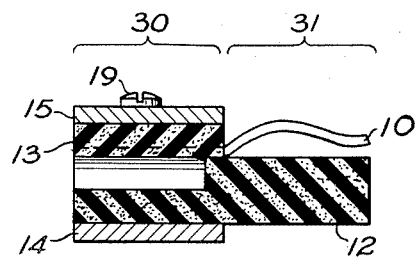
Figure 6:
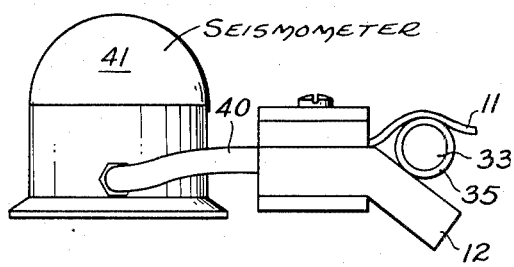

For a further understanding of the invention and for a more complete description thereof, reference may now be had to the following description taken in conjunction with the accompanying drawings in which:

Fig. 1 is a top view of the cable connector;
Fig. 2 is a sectional view taken along the line 2—2 of Fig. 1;
Fig. 3 is an exploded view of the connector;
Fig. 4 illustrates the exposed cylindrical cable contacts;
Fig. 5 is a top view of a seismometer connected to an associated cable; and
Fig. 6 is an end view of the cable connection.

Referring to Figs. 1–3, there is illustrated a pair of rigid contacting members 10 and 11, each having substantial curvature at the free end portions thereof. The other ends of each of the rigid contacts are flat and are clamped between a large rubber block or sheet 12 and a small rubber block 13. A pair of metal plates 14 and 15 corresponding in shape to the small rubber block 13 serve as clamping plates for the entire structure. Plate 14 is positioned below rubber block 12. Plate 15 is positioned on top of block 13. Apertures 17 and 18 in block 15 extend through block 13, through the contacts 10 and 11 respectively, through the rubber block 12 and in a threaded fashion through the lower plate 14. A pair of screws 19 and 20 extend through the apertures 17 and 18 and threadedly engage the plate 14 rigidly to clamp the entire structure together as a single unit.

A pair of non-conducting tubular members 21 and 22 extend through a portion of apertures 17 and 18, at least through that portion which includes the contacts 10 and 11 and around screws 19 and 20 to insulate the contacts from the metallic end plates 14 and 15 which otherwise would short-circuit them. The rubber block 12 has provided at the end adjacent the apertures 17 and 18 a cable receiving opening 25. A cable 40 is to be received by the cylindrical opening 25. A pair of the cable conductors, electrically common to the associated seismometer, are then threaded along the top surface of the rubber block 12 and soldered or otherwise electrically connected with the contacts 10 and 11 respectively.

With the unit thus constructed, the portion 30, Fig. 2, of the connector is relatively rigid and non-yielding, capable of withstanding great abuse, high pressures, etc., such as it might be subject to under field use. The end portion 31, Fig. 2, is characterized by a pair of rigid metallic extensions which, if made of relatively thick stainless steel, are not subject to ready bending or other deformation even when subject to great abuse. The cantilever supported extension of the rubber block 12 adjacent the metallic connector portions will yield under pressure to cushion the metallic connector portions and thereby absorb shocks that might otherwise deform the connecting elements. Thus, the system is capable of abuse such as is unavoidable in the placing, connecting, and otherwise handling of seismic detectors and provides a structure for readily contacting cable elements. At the same time, the cantilever supported extension develops contact maintaining forces when displaced away from the contact members 10 and 11 as by insertion of a cable.

Referring now to Fig. 4, a cable has been illustrated with suitable contacts of a form found to be preferred for operation with the connector of Figs. 1–3. The cable 33 may include a plurality of the pairs of electrical conductors to accommodate a plurality of geophones located at a plurality of spaced stations. Connecting provisions at one such station are illustrated in Fig. 4 and comprise two axially spaced cylindrical contact surfaces, each formed by winding a metallic conductor helically around the periphery of the cable. A braided wire of, for example, phosphor-bronze has been found to be preferable. A first exposed cylindrical contact is illustrated as comprising four turns of a conductor at a first point 35. A second contact member 36 is provided by six turns of a similar conductor helically disposed about the cable periphery at a second point. The two contacts are so spaced axially along the cable as to be substantially insulated one from another and in such spacing to register with the contact elements 10 and 11, Fig. 1. The sheath of the cable 33 is then opened and the two selected conductors are brought out and connected as by soldering or tying (as illustrated) to complete an electrical circuit in the cable to the cylindrical contact areas. The contact areas preferably are made of different axial length to provide a polarizing indication for the connectors. The portion of the cable adjacent to the contacts but not occupied thereby is then covered with a suitable insulating and water-proofing material, preferably by a rubber of the type which may be later vulcanized to prevent entry of water into the cable itself.

As illustrated in Fig. 5 and Fig. 6, a cable 40 extends from a seismometer 41 to the plug unit which is shown fitted onto the associated contacts on cable 33. As best seen in Fig. 6, the cantilever extending end of the rubber mass 12 exerts a force upward against the cable to force the contact 10 against the associated contact area provided by the winding 35.

It will now be seen that the present invention provides a new and useful plug for a local seismometer circuit which comprises a clamp including a pair of metallic plates. Resilient sheets such as of rubber are positioned between the plates and one of the sheets has substantial thickness and forms a cantilever extension outside the perimeter of the plates. A pair of rigid contact members connected at the terminus of the local seismometer circuit in part are positioned between the rubber sheets and in part extend as cantilevers outside the perimeter of the plates in a spaced apart relation along a line normal to the length of the extension of the rubber sheet and are provided with concave contact surfaces at the extremities thereof facing the rubber extension. The screw means are insulated from the contact members but extend through the contact members to maintain them in a predetermined spaced apart relation and at the same time engage both of the outside metallic plates to draw them together rigidly to clamp the sheets and contact members. Thus clamped, the extension develops forces toward or away from the contact surfaces upon relative displacements between the rubber extension and the contact members and at the same time yields resiliently when subject to what would otherwise be contact deforming stresses. The resilient character of the rubber extension develops the contact maintaining forces for the plug system while at the same time provides the necessary protection for the plug system when subject to unusual forces. The relative spacings between the plug contacting members and the cable contacting members are fixed, and the polarizing indications are provided to assure that there will always be contact certain between a seismometer and cable terminals. It will be recognized that an important feature of the invention is the provision of rigid contacts and a resilient member facing the contacts to provide the contacting forces in a system in which all the rigid extensions lie in the same plane or planes. The rigid contacts have been shown as curved metallic strips. In one embodiment of the invention, such strips were 5/8 inch and 3/8 inch wide respectively and were formed from stainless steel stock approximately 1/16 inch thick. The overall length of the contacts was approximately 2¼ inches with approximately half of that extending from the clamping mechanism. It will be appreciated that the plate 15, Fig. 2, could be shaped to extend the full length of the contacts 10 and 11 to provide additional support to the contacts. In the present embodiment the contacts extend from the clamping structure without such support. If the latter modification were to be incorporated, of course, suitable means would be provided for insulating the contacts from the entire upper plate to prevent short-circuiting of the contact areas.

While certain modifications of the invention have been described, it is to be understood that further modifications may now suggest themselves to those skilled in the art, and it is intended to cover such modifications as fall within the scope of the appended claims.

What is claimed is:

1. A plug for a local seismometer circuit which comprises a clamp including a pair of rigid metallic plates, a pair of resilient insulating sheets positioned between said plates, one of which has substantial thickness and forms a cantilever extension outside the perimeter of said plates, a pair of rigid contact members connected at the terminus of said local circuit in part positioned between said resilient sheets and in part extending as cantilevers outside the perimeter of said plates in a spaced apart relation along a line normal to the length of said extension and having concave contact surfaces at the extremities thereof facing said extension, and means insulated from said contact members for drawing said plates together rigidly to clamp said sheets and contact members whereby said extension develops forces toward or away from said contact surfaces upon relative displacement between said extension and said contact members.

2. A plug for a local seismometer circuit which comprises a clamp including a pair of rigid metallic plates, a pair of rubber sheets positioned between said plates, one of which has substantial thickness and in part forms a cantilever extension outside the perimeter of said plates, a pair of rigid contact members connected at the terminus of said local circuit in part positioned between said rubber sheets and in part extending as cantilevers outside the perimeter of said plates in a spaced apart relation along a line normal to the length of said extension and having concave contact surfaces at the extremities thereof facing said extension, and means insulated from but extending through each of said contact members and engaging both of said plates to draw them rigidly together to clamp said sheets and said contact members whereby said extension develops forces toward or away from said contact surfaces upon relative displacement between said extension and said contact members.

3. In combination, a seismic cable having conductors extending lengthwise thereof, connecting means for completing a circuit from a selected pair of said cable conductors to a local seismometer circuit which comprises a frame structure, a resilient deformable rubber member supported by said structure having a cantilever type extension, a pair of rigid metallic contact strips mounted in said structure in a spaced apart relation along the width of said extension and themselves extending as cantilevers in the same direction as said extension and spaced from said extension near the extremity thereof a preselected distance, each of said contact strips having an electrical connection to said local circuit at one end and a curved portion at the opposite end to form a concave surface facing said extension, a pair of conductive members mounted on the periphery of said seismic cable in a spaced apart relation along the length of said cable corresponding to the spacing between said contact strips each to be maintained under the pressure of said extension in contact with said opposed concave surfaces of said strips, and electrical connections between said conductive members and a selected pair of said cable conductors.

4. An electrical connector assembly comprising a strong, rigid contact member of appreciable length, a compressible elastic member of appreciable length and thickness and of electrical insulating material, clamping means respectively extending across end portions of said contact member and said elastic member rigidly to hold them together with their extremities forming cantilevers relative to said clamping means, said clamping means including a compressible elastic member disposed on the side of said contact member opposite said first-named elastic member, said cantilever extension of said elastic member being bodily bendable relative to its clamped end portion for development of high contact pressure between it and the associated cantilever end of said rigid contact member, and said cantilever extension of said elastic member being bodily deformable to act as a cushion for said rigid member upon application of high pressure to minimize bending and injury to the connector assembly.

5. The combination set forth in claim 4 in which there are more than one of said rigid contact members laterally spaced one from the other, said elastic member having a width at least coextensive with said laterally spaced contact members and upon bending of said elastic member away from said contacts developing high contact pressures for them.

6. An electrical connector assembly comprising a strong rigid contact member of appreciable length, a first compressible elastic member of appreciable length and thickness and of electrical insulating material disposed on one side of said member and coextensive therewith, a second compressible elastic member which is short compared with the length of said first member, and clamping means respectively extending across end-portions of said elastic members on opposite sides of said contact member rigidly to hold them together with the extremities of said contact member and said first member forming cantilevers relative to said clamping means, said rigid member being resiliently supported between said elastic members, said cantilever extension of said elastic member of appreciable length being bodily bendable relative to its clamped end-portion for development of high contact pressures between it and the associated cantilever end of said rigid contact member, both of said elastic members being resiliently deformable to act as cushions for said rigid member upon application of high external pressure thereto.

References Cited in the file of this patent

UNITED STATES PATENTS

| 1,145,338 | Vanderhoof | July 6, 1915 |
| 2,248,718 | Owen | July 8, 1941 |
| 2,253,830 | Winterhalter | Aug. 26, 1941 |
| 2,283,454 | Osterloo | May 19, 1942 |
| 2,581,994 | Winterhalter | Jan. 8, 1952 |

FOREIGN PATENTS

| 70,446 | Sweden | Oct. 21, 1930 |